Jan. 14, 1969  R. E. ELY  3,421,366
MULTIAXIAL STRESS APPARATUS
Filed Sept. 26, 1966  Sheet 1 of 3

FIG. I

Richard E. Ely,
INVENTOR.

BY Harry M. Saraposis
Edward J. Kelly
Herbert Berl
Harold W. Hilton

United States Patent Office 3,421,366
Patented Jan. 14, 1969

3,421,366
MULTIAXIAL STRESS APPARATUS
Richard E. Ely, Huntsville, Ala., assignor to the United States of America as represented by the Secretary of the Army
Filed Sept. 26, 1966, Ser. No. 582,480
U.S. Cl. 73—93                                    4 Claims
Int. Cl. G01n 3/10

ABSTRACT OF THE DISCLOSURE

Apparatus for testing cylindrical tube specimen in both the tension-tension and tension-compression quadrants. The apparatus includes a piston and cylinder assembly disposed in series with a tubular specimen wherein the cylinder and specimen are filled with a compressible fluid and a universal testing machine is disposed for actuating the piston for internal pressurization of the assembly while simultaneously subjecting the specimen to axial loads.

---

Many investigations have been conducted with thin-walled tubes in order to establish failure criteria for general and uniform stress states; however, special apparatus has usually been constructed for applying the biaxial stress to the specimen, and no apparatus for simultaneously generating pressure within the tube while applying an axial load to the specimen has been disclosed for utilization by a universal testing machine.

It is, therefore, an object of the present invention to provide apparatus for testing a specimen in both the tension-tension and tension-compression quadrants while simultaneously generating pressure within the specimen.

It is a further object of the present invention to provide such apparatus for use with universal testing machines.

To accomplish the foregoing objects, the present invention includes a piston and cylinder assembly mechanically connected in series with a tubular specimen. The cylinder and specimen are filled with fluid and a passageway is disposed in fluid communication between the cylinder and specimen. A universal testing machine applies an external load to the apparatus to move the piston for forcing fluid into the interior of the specimen for internal pressurization thereof while simultaneously subjecting the specimen to an axial load. This produces essentially proportional biaxial loading of the specimen.

Other objects, features, and advantages will become more readily apparent from the following detailed description taken in conjunction with the accompanying drawing wherein.

Figure 1:
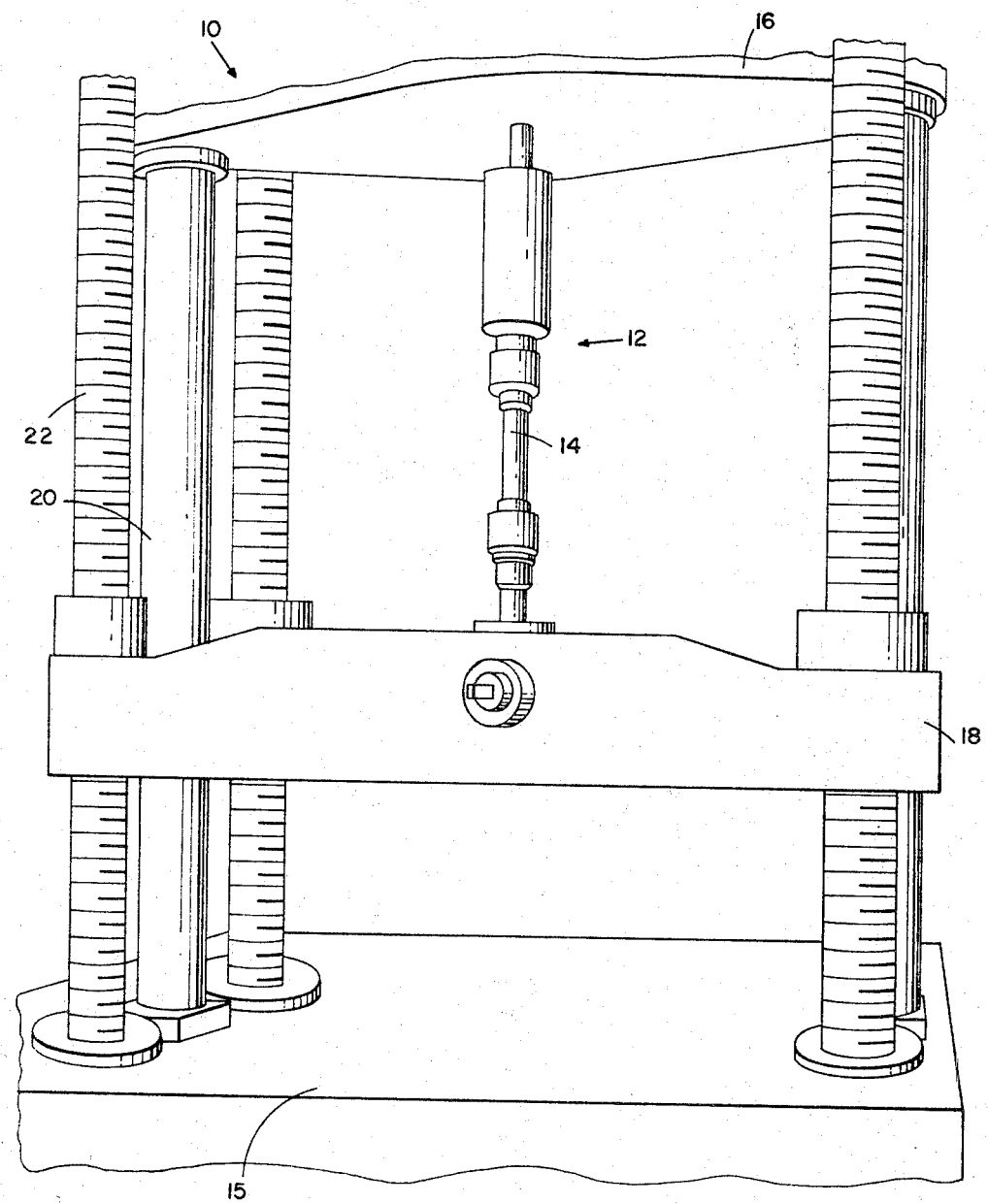
FIGURE 1 is an elevational view of a universal testing machine utilizing the tension loading apparatus of the present invention.

As shown in FIGURE 1, a universal testing machine, generally designated by the numeral 10, is used to provide tension loading to apparatus 12 for testing of a cylindrical tube specimen 14 under biaxial tension-tension stresses.

The universal testing machine (FIGURE 1) typically includes a bed or weighing table 15, a fixed head 16, movable head 18, guide member 20, actuating screw 22 and a source of power (not shown). The tension loading apparatus 12 is illustrated in FIGURE 1 as mounted between fixed head 16 and movable head 18.

Figure 2:
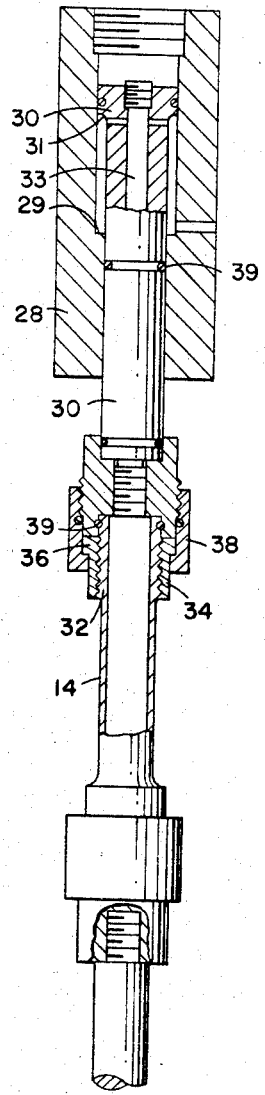
FIGURE 2 is a sectional view of the tension loading apparatus used in FIGURE 1.

The tension loading apparatus is more clearly illustrated in FIGURE 2 and is shown to include a cylinder 28 and a piston 30 secured in series relationship with specimen 14. Piston 30 includes an aperture 33, therethrough communicating with the interior of the specimen and the interior of the cylinder. If desired, instead of machining aperture 33 in the piston, a conduit may connect externally to the cylinder and specimen in fluid communication with the interiors thereof, for the internal pressurization of the specimen.

The cylindrical specimen used in the tension testing apparatus is provided with external threads 32 adjacent the ends thereof. A collar 34 is disposed in threaded relation with the specimen and is provided with a flanged portion 36. A threaded end cap 38 is disposed in threaded relation with the piston and is provided with an annular seat for engagement with flanged portion 36 of collar 34 for securing the specimen to the piston. A plurality of O-ring seals 39 seals the apparatus against leakage.

The testing machine's load is utilized to simultaneously generate pressure within the tube and to supply an axial load to it. Fluids, such as water, may be used as the pressurizing medium. The loading rates can be readily varied by operating the testing machine at different crosshead velocities.

In operation, head 18 of universal testing machine 10 is moved away from fixed head 16 at a desired velocity as is done in conventional tensile testing machines. This movement imparts a tension loading to the apparatus. At the same time, piston 30 is moved relative to cylinder 28 to force fluid between the bottom face 31 of piston 30 and the lower end wall 29 of cylinder 28, through aperture 33 and into the interior of the specimen. The biaxial loading is proportional and may be applied at varying rates which are reasonably constant.

The universal testing machine typically is provided with a weighing system which is used to obtain load information as a function of time. The pressure within the tube specimen is sensed and recorded by instrumentation including an electrical-resistance-type pressure cell and a pen recorder. A Bourdon-pressure gage may be used to verify the ultimate pressure valves.

Figure 3:
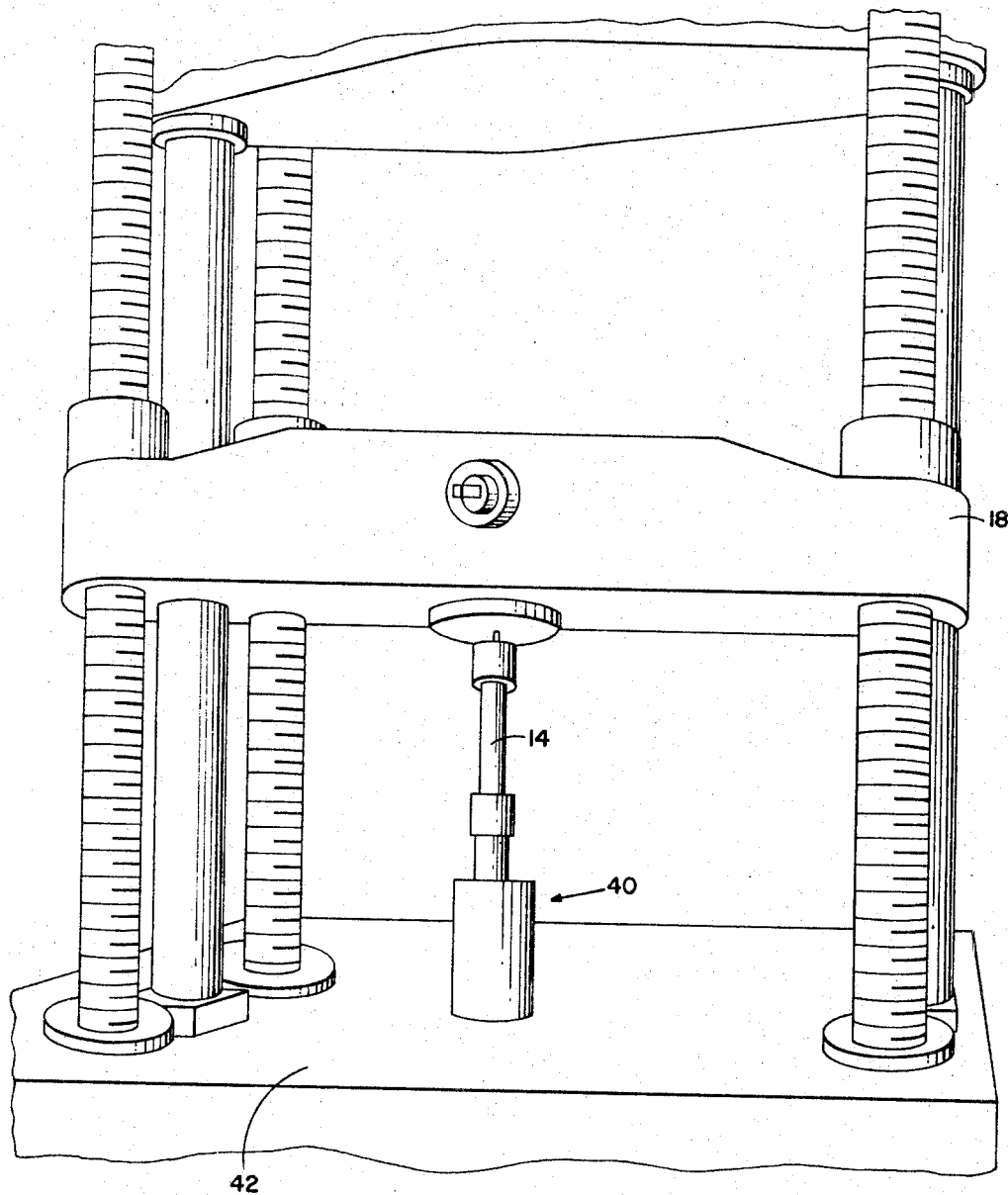
FIGURE 3 is an elevational view of a universal testing machine using the compression loading apparatus of the present invention.

The universal testing machine is illustrated in FIGURE 3 with a compression loading apparatus 40 shown positioned therein. This embodiment of the invention includes similar structure to the embodiment discussed supra and like numerals will be used to designate like parts. The principle of this embodiment is similar to the preceding in that a piston and cylinder is in fluid communication with a specimen and disposed in series relation therewith.

The compression loading apparatus 40 is illustrated in FIGURE 3 as mounted between bed 42 and movable head 18 for application of compression stresses to specimen 14.

Figure 4:
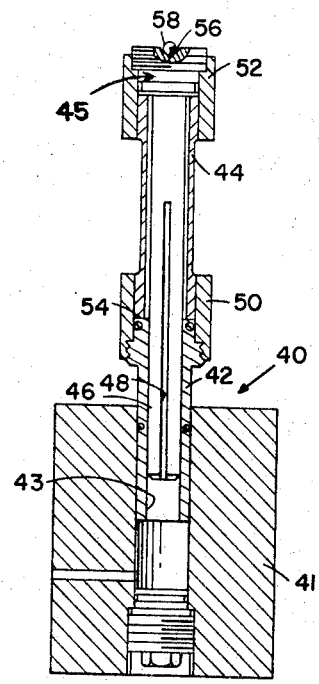
FIGURE 4 is a sectional view of the compression loading apparatus as used in FIGURE 3.

The compression loading apparatus 40 is more clearly illustrated in FIGURE 4 and includes a cylinder 41 and a piston 42 secured in series relation with a compression specimen 44. Piston 42 includes an aperture 43 axially therethrough in communication with the interior of the specimen and the interior of cylinder 41.

A guide pin 46 is mounted in aperture 43 and extends into the interior of the specimen to assure alignment of the specimen. Guide pin 46 is provided with fluid passageways 48 in the form of grooves in the side of the pin. The grooves communicate with the interior of the specimen for passage of fluid into the specimen.

The specimen used in the compression loading apparatus does not have to have its ends threaded. To secure the specimen in the compression testing apparatus, there is provided a pair of adapters 50 and 52. Adapter 50 is disposed in threaded engagement with the end of piston 42 which forms a seat 54 on which an end of the specimen is seated. Upper adapter 52 is secured in threaded relation with one end 45 of guide pin 46 and extends therefrom to form a cylindrical member seated around the end of the specimen. To transmit the loads to the ends of the specimen, a steel ball 54 is mounted in a groove 56 provided in the end 45 of the guide pin. O-ring seals 58 seal the apparatus against leakage.

The operation of this embodiment is substantially as discussed above except the movement of the head and bed is inward for compression loading of the specimen. An extensometer may be attached to the specimen of the compression apparatus specimen.

If desired, a conduit may be connected to the cylinders and to a pressure gage to indicate the pressure in the cylinders and specimen.

The structure of the present invention provides a means for applying multiaxial stresses to tubular specimen. Various stress ratios or loading paths may be obtained by using piston and cylinder diameters of different dimensions. These stress ratios also are dependent upon the dimensions of the tube specimen, but in all cases, the biaxial loading remains essentially proportional.

Quite obviously, many modifications of the present invention may be resorted to by one skilled in the art but such modifications are within the spirit and scope of the appended claims.

What is claimed is:

1. In a universal testing machine having a first and second head disposed for relative movement therebetween for applying a load to a specimen carried between said heads for imparting stresses to said specimen; apparatus for internally pressurizing the specimen comprising a cylinder having a piston carried therein, said cylinder secured to said first head, said piston provided with an internal passage disposed longitudinally therethrough and having one end thereof extending out of said cylinder for attachment to one end of said specimen, means for attaching said piston to said specimen including a first end member secured to said piston and provided with external threading, a second end member secured in threaded relation with a first end of the specimen and having a first flanged portion extending therefrom, a coupling member disposed in threaded engagement with said first end member and having a second flanged portion disposed for abutting relation with said first flanged portion for retention of said piston and said specimen in secured relation for tensile testing of said specimen, and, means for attaching said specimen to said second head.

2. In a universal testing machine having a first and second head disposed for relative movement therebetween for applying a load to a specimen carried between said heads for imparting stresses thereto; apparatus for internally pressurizing the specimen comprising a cylinder having a piston carried therein, said piston having an internal passage disposed longitudinally therethrough and said piston further having one end thereof extending out of said cylinder for support of said specimen, means for attaching said piston to said specimen including a first end cap disposed in threaded relation with said piston and extending upwardly therefrom to form with one end of said piston, a seat for support of said specimen and a second end cap disposed on the other end of said specimen and having a guide member secured thereto and extending through said seating means and into said piston passage for alignment of said specimen in the apparatus.

3. Apparatus as in claim 2 wherein said guide member includes a plurality of grooves longitudinally thereon in communication with the interior of said specimen and cylinder for passage of fluid therebetween for the internal pressurization of said specimen responsive to application of compressive loads of said apparatus.

4. Apparatus as set forth in claim 3 including a ball joint disposed on said end cap for engagement by said mechanism for transmitting said compressive loads to said specimen.

References Cited

UNITED STATES PATENTS

| 2,336,524 | 12/1943 | Bannister | 73—49.5 X |
| 2,493,061 | 1/1950 | Devine et al. | 73—49.4 |
| 2,497,193 | 2/1950 | Webb | 73—49.6 |
| 2,329,035 | 9/1943 | Cross | 73—49.4 |

FOREIGN PATENTS

| 370,334 | 4/1932 | Great Britain. |
| 717,403 | 2/1942 | Germany. |
| 946,668 | 8/1956 | Germany. |

RICHARD C. QUERSSER, *Primary Examiner.*

CHARLES A. RUEHL, *Assistant Examiner.*

U.S. Cl. X.R.

73—49.4